United States Patent
Yoon et al.

[11] Patent Number: 5,906,154
[45] Date of Patent: May 25, 1999

[54] JUICE EXTRACTOR

[75] Inventors: Jeong Kyu Yoon; Yun Ja Kang, both of Pusan, Rep. of Korea

[73] Assignee: Dong-A Engineering Co., Ltd., Pusan, Rep. of Korea

[21] Appl. No.: 09/187,821

[22] Filed: Nov. 6, 1998

[30] Foreign Application Priority Data

Nov. 25, 1997 [KR] Rep. of Korea ............. 1997-34075
Sep. 25, 1998 [KR] Rep. of Korea ............. 1998-18334

[51] Int. Cl.[6] .............. A23N 1/00; A23N 1/02; A47J 43/046; A47J 43/07
[52] U.S. Cl. .............. 99/510; 99/495; 99/513; 100/117; 100/145; 241/101.2; 241/260.1; 241/261
[58] Field of Search ............. 99/495, 509–513, 99/492; 241/37.5, 92, 101.2, 260.1, 261, 282.1, 282.2, 199.12; 366/314, 84, 318, 172, 601, 176, 295; 100/117, 145; 426/481, 482, 489, 518, 616

[56] References Cited

U.S. PATENT DOCUMENTS

| | | | |
|---|---|---|---|
| 4,363,265 | 12/1982 | Tanioka et al. | 99/510 |
| 4,385,553 | 5/1983 | Ihara et al. | 100/117 X |
| 4,393,760 | 7/1983 | Hasegawa . | |
| 4,429,626 | 2/1984 | Ihara et al. | 100/145 X |
| 4,643,085 | 2/1987 | Bertocchi | 99/513 X |
| 5,156,872 | 10/1992 | Lee | 426/489 |
| 5,249,514 | 10/1993 | Otto et al. | 366/172 X |
| 5,381,730 | 1/1995 | Kim | 241/260.1 |
| 5,396,836 | 3/1995 | Kim | 99/510 |
| 5,452,650 | 9/1995 | Lee | 241/101.2 |
| 5,806,413 | 9/1998 | Trovinger | 99/492 |

Primary Examiner—Timothy F. Simone
Attorney, Agent, or Firm—Dellett and Walters

[57] ABSTRACT

Juice extractor, is disclosed, for crushing fruits or leaves, or root of green vegetable for extracting green juice, wherein, considering the incomplete juice extraction of the related art juice extractor, the present invention is provided with thread end portions and vacant portions at a rear portion of a screw for enhancing a crushing effect, and a fore end portion with reduced diameter at a fore end thereof, to which fore end a juice extracting member having detachable extracting net member and mounting member is coupled for secondary extraction, that improves a juice extraction efficiency, whereby further improving a pressing effect of the raw material for extracting juice, which provides a better yield, allowing an easy removal of remnants accumulated inside of the juice extracting components, to maintain the extractor clean, reducing a ratio of elasticity degradation caused by a prolonged use, and using in making noodle, as an alternative use.

5 Claims, 5 Drawing Sheets

JUICE EXTRACTOR

BACKGROUND OF THE INVENTION

1. Field of the Invention

The present invention relates to a juice extractor, and more particularly, to a juice extractor in which structure of a fore end and top edges of screw is improved for improvement of a crushing efficiency of the screw, a net member with a net and fitting member with packing both in an extracting member are made detachable for easy handling, and a secondary juice extraction between the fore end of the screw and the extracting member is made available for improving a juice extracting efficiency.

2. Background of the Related Art

In general, the juice extractor extracts green juice by crushing fruits, leaves, or roots of green vegetable. As shown in FIG. 1, the juice extractor is provided with a driving unit M having a motor for providing a driving power, and a housing H connected to the driving unit M for accommodating a juice extracting device. The housing H has a hopper HP for introducing raw material therethrough at a top thereof, a juice outlet E at a bottom thereof, and a fastening cap C with a discharge opening W formed therein fastened at a fore end of the housing H for discharging remnants remained after producing juice.

The juice extracting device in the housing H has a screw as a major component for crushing the raw material. There is a related art juice extractor with two screws for rotating the two screws on the same time to crush a raw material and extract juice. However, this related art juice extractor has problems in that the structure is complicated, crushing strength is weak, and sliding of the two screws produces metal particles that are entrained into the juice.

Accordingly, as shown in FIG. 6, one of related art juice extractor of a single screw design is provided with a juice extracting member 40 fitted at an outer circumference of a fore end of the screw S having a juice extracting net 41 of stainless steel for pressing the crushed raw material onto the juice extracting member 40 to extract juice. That is, in this related art juice extractor, raw material introduced through the hopper HP in the housing H is crushed and transported forward, and pressed onto the juice extracting member 40 fastened to the fore end of the screw S, for extracting juice. The extracted juice can be obtained through a juice outlet E, and remnants after extraction of juice is discharged through the discharge opening W formed in the fastening cap C fitted at the fore end.

However, these related art juice extractor has not been adequate in the crushing of the raw material introduced into the juice extractor and has a low extraction efficiency because the pressed and crushed raw material by rotating action of the screw S is not pressed adequately while passing through a funnel form of sloped juice extracting net 41. And, there have been drawbacks that raw materials, such as vegetable or fruits should be cut into small pieces before introduction into the hopper H and removal of accumulated remnants between small spaces in the juice extracting member 40 is not easy. And, a juice extracting packing 42 with the remnant discharge opening at a center fitted at the fore end of the juice extracting member 40 for an increased juice extracting efficiency is involved in degradation of elasticity from prolonged use, particularly at the center portion with the opening at which the pressing force is the strongest, which degradation of elasticity drops the pressing force. And, moreover, these related art juice extractor have been merely used as a juice extractor and food crusher.

SUMMARY OF THE INVENTION

Accordingly, the present invention is directed to a juice extractor that substantially obviates one or more of the problems due to limitations and disadvantages of the related art.

An object of the present invention is to provide a juice extractor which has improved crushing and pressing efficiency of raw material for improving yield of the juice, allows an efficient removal of remnants accumulated in a juice extracting member, reduces degradation of elasticity of a juice extraction packing for prolong lifetime of the packing, and has a versatility in use of the juice extractor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the juice extractor having a screw in a housing mounted on a shaft for being driven by a motor in a driving unit and a juice extracting member at a fore end of the screw for extracting juice from raw material introduced through a hopper, includes the screw, the juice extracting member, and a secondary juice outlet, wherein the screw having a plurality of thread end portions at each of which a thread starts, and vacant portions, both on an outer circumference thereof, a front portion having a pressing portion with a slope to reduce a diameter, and a fore end portion formed connected to the front portion and having helical threads, the juice extracting member having a cylindrical extracting net member with a juice extracting net on an outer circumference, and a plurality of longitudinal ribs on outside of the juice extracting net, for insertion of the fore end portion of the screw thereto, and a mounting member with coupling grooves in an inside diameter thereof, with a number and a size to correspond to the ribs on the juice extracting member, for inserting and coupling thereto, a packing with a split portion at a thin central portion split radially for providing a passage, and a discharging portion at a front portion thereof formed as a unit with the mounting member for tight insertion into the discharge opening W in the fastening cap C, and the secondary juice outlet being under a fore end of the housing for discharge of juice extracted secondarily pressed at the juice extracting member.

That is, the juice extractor of the present invention is provided with thread end portions and vacant portions, and two stepped of diameters on the screw for improving a crushing effect of the introduced raw material, wherein a pressing portion with a gradually reduced diameter for further pressing the raw material, a small diametered fore end portion with helical threads connected to the pressing portion, and a juice extracting member adapted to be coupled to the fore end portion of the screw for conducting a secondary extraction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
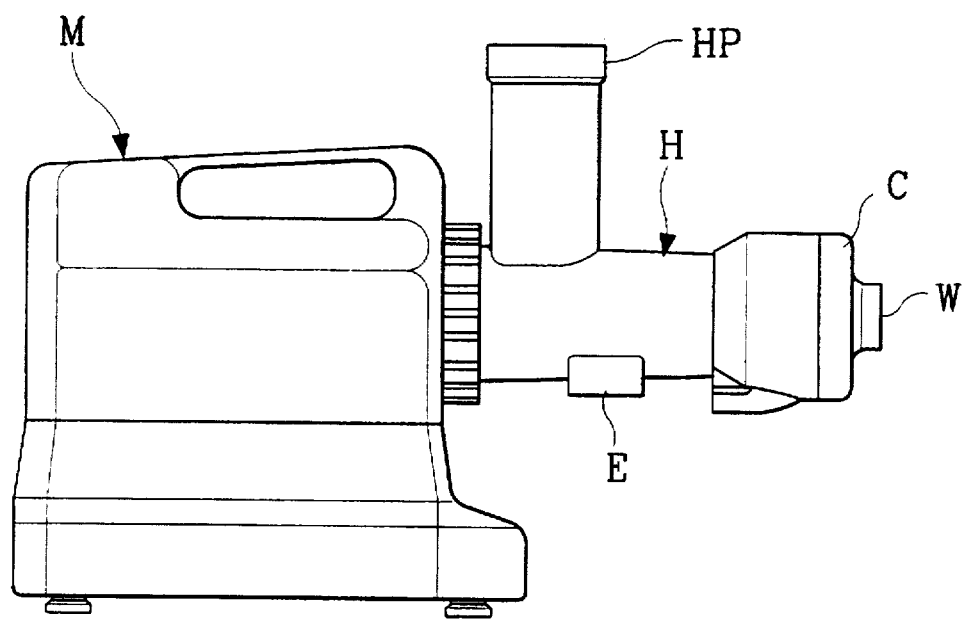
FIG. 1 illustrates an outside view of a related art juice extractor, schematically.

Reference will now be made in detail to the preferred embodiments of the present invention, examples of which are illustrated in the accompanying drawings. Parts identical to the related art are given the same reference numerals.

Referring to FIG. 1, a basic structure of the juice extractor of the present invention has a generally known structure, wherein a housing H connected to a driving unit has a hopper HP on top thereof, a screw is provided inside of the housing H, and a fastening cap C with discharge opening W is provided at a front part of the housing H.

Figure 2:
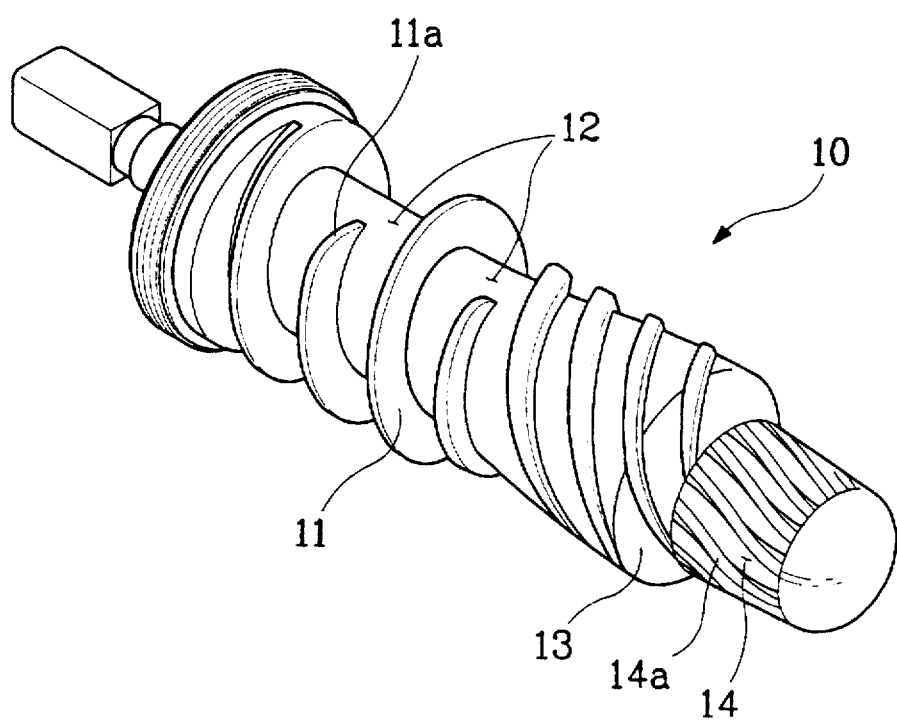
FIG. 2 illustrates a perspective view of a screw in accordance with a preferred embodiment of the present invention.

FIG. 2 illustrates a perspective view of the screw 10 in accordance with a preferred embodiment of the present invention includes a plurality of thread end portions 11a at each of which a thread, formed on an outer circumference of the screw, ends suddenly, a vacant portion 12 without the thread 11 formed in the vicinity of each of the thread end portions 11a, a pressing portion 13 sloped downwardly in forward direction at a front portion of the screw 10 body, and a fore end portion 14 continuous to the pressing portion 13 having a small diameter. That is, the thread end portions 11a and the vacant portions 12 are provided at a rear portion of the screw that is disposed right below the hopper H into which raw material is introduced, for crushing the raw material, and the sloped pressing portion 13 with a gradually reduced diameter at a front portion of the screw 10 and, in continuation to the pressing portion 10, the fore end portion 14 with a reduced diameter are formed, providing two staged screw 10. The fore end portion 14 has helical threads 14a formed in a longitudinal direction.

Figure 3:
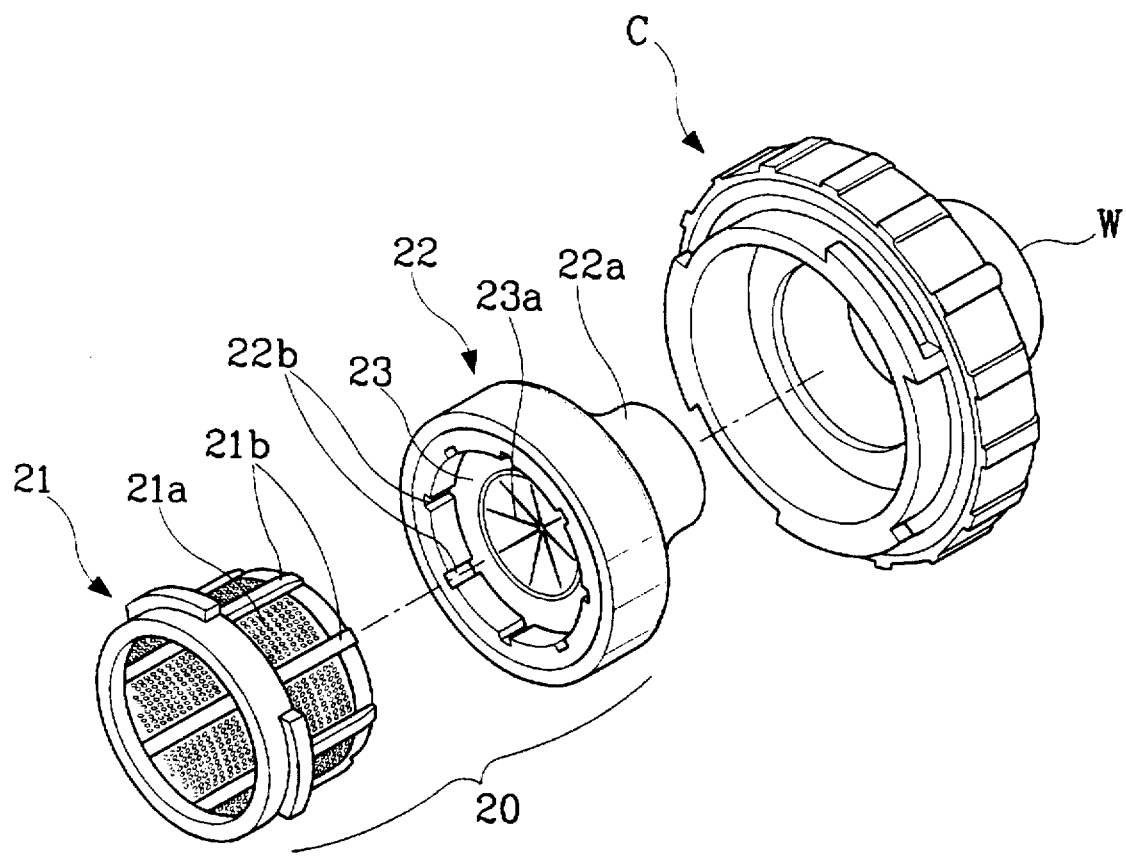
FIG. 3 illustrates a perspective disassembled view of a juice extracting member in accordance with a preferred embodiment of the present invention.
Figure 4:
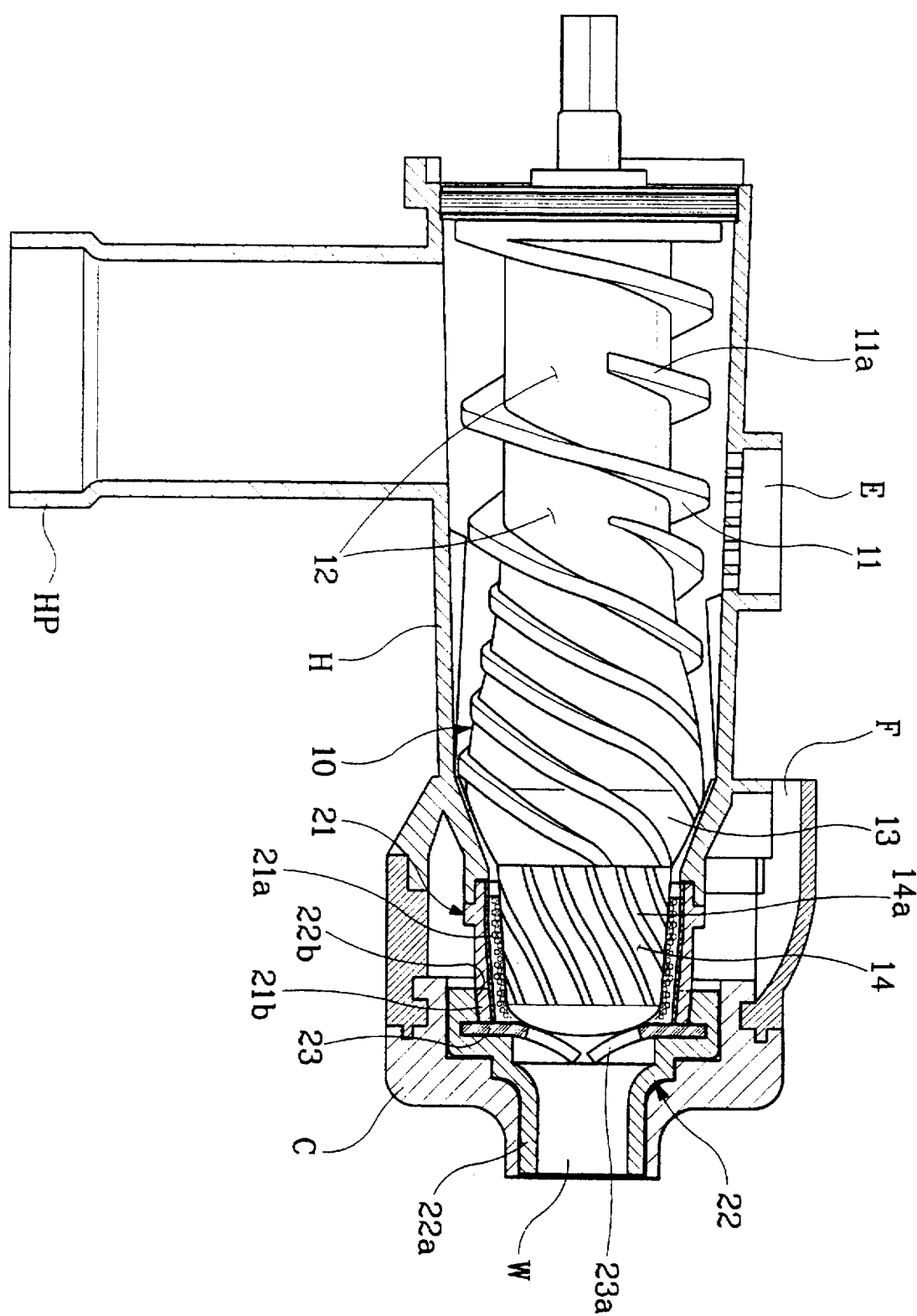
FIG. 4 illustrates a section showing an inside structure of a juice extractor in accordance with a preferred embodiment of the present invention.

FIG. 3 illustrates a perspective disassembled view of a juice extracting member 20 in accordance with a preferred embodiment of the present invention. The juice extracting member 20 is coupled to the fore end portion 14 of the screw 10 for carrying out juice extraction, into which the fastening cap C is fastened. The juice extracting member 20 has an extracting net member 21 and mounting member 22, both of which are detachable. The extracting net member 21, the mounting member 22, and the fastening cap C are fitted in this order. The juice extracting member 21 is cylindrical and has an extracting net 21a on an outer circumference thereof and a plurality of ribs 21b on the outer circumference. The mounting member 22, adapted to be coupled to a fore end of the extracting net member 21, has coupling grooves 22b formed to be matched to the ribs 21b on the extracting net member 21 in number and size. And, there is a packing 23 at an inner side of the mounting member 22, which is preferably to be designed freely detachable from/to a groove in an inside circumference of the mounting member 22. The packing 23 has a thickness thicker at periphery than a central portion. The packing 23 has a central portion split radially in place of the opening in the related art, forming a split portion 23a. As shown in FIG. 4, the split portion 23a is preferably bent forward toward an outlet to a certain extent. There is a discharging portion 22a at a front portion of the mounting member 22 formed as a unit with the mounting member 22 for tight insertion into the discharge opening W in the fastening cap C.

FIG. 4 illustrates a section showing an inside structure of a juice extractor in accordance with a preferred embodiment of the present invention, wherein it is shown that the screw 10 and the juice extracting member 20 are mounted inside of the housing H, to which the fastening cap C is fastened. That is, the ribs 21b on the juice extracting member 21 are inserted into the coupling grooves 22b in the mounting member 22, and the fore end portion 14 of the screw 10 is inserted into an inner cavity of the juice extracting member 21.

The operation of the aforementioned juice extractor of the present invention will be explained with reference to the attached drawings.

In the juice extractor of the present invention, upon introduction of raw material, such as vegetable and fruits, into the hopper HP after the raw material is cut to an appropriate size, the screw 10 crushes and transports forward, to extract juice, which operation is identical to a general juice extractor. However, in the juice extractor of the present invention, the raw material introduced into the vacant portion 12 is crushed by the thread end portion 11a at which the thread starts as the screw 10 rotates. That is, as the screw 10 rotates, the thread end portions 11a act as hammers hammering the raw material, which enhances the crushing effect, with a better distribution of the raw material, thereby improving juice extraction on larger pieces of the raw material.

The raw material moving forward along the threads 11 on the screw 10 in continuation to the crushing operation reaches to the pressing portion 13 where the crushed raw material is primarily pressed between an inside of the housing H and the pressing portion 13, squeezing out juice. The juice extracted thus primarily is discharge through the juice outlet E. And, the crushed raw material passed through the pressing portion 13 is pushed forward to the fore end portion 14 of the screw 10 and the extracting net member 21, where the crushed raw material is further pressed, squeezing out juice through the juice extracting net 21a in the extracting net member 21, secondarily. The extracted juice for the second time is discharged through a secondary juice outlet F. On the other hand, since the fore end portion 14 of the screw 10 presses the crushed raw material forward in the secondary juice extracting process, while the crushed raw material is pressed by the packing 23, the remnant of the crushed raw material is further squeezed to yield remained juice further, which improves juice extracting efficiency.

Figure 5:
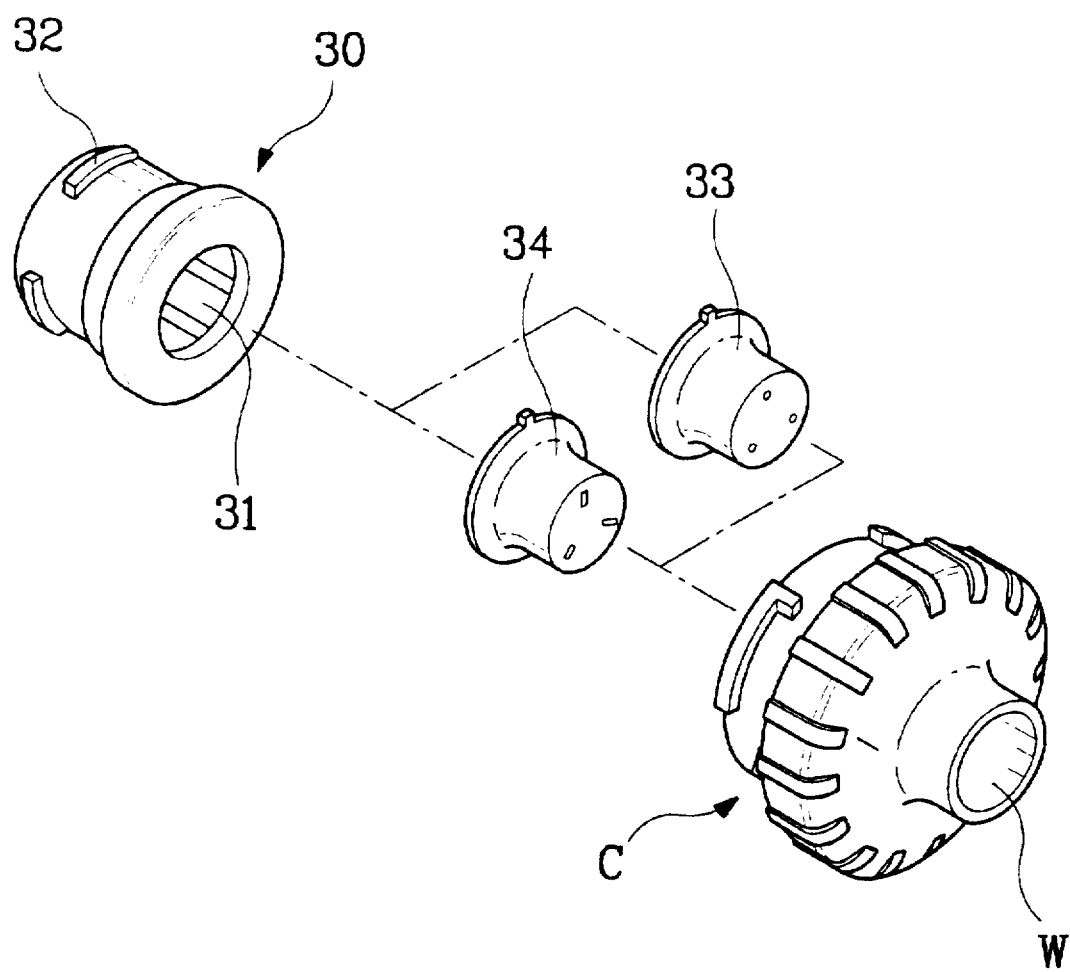
FIG. 5 illustrates a perspective disassembled view of key parts showing another embodiment of the present invention; and, FIG. 6 illustrates a perspective disassembled view of key parts of a related art juice extractor.
Figure 6:
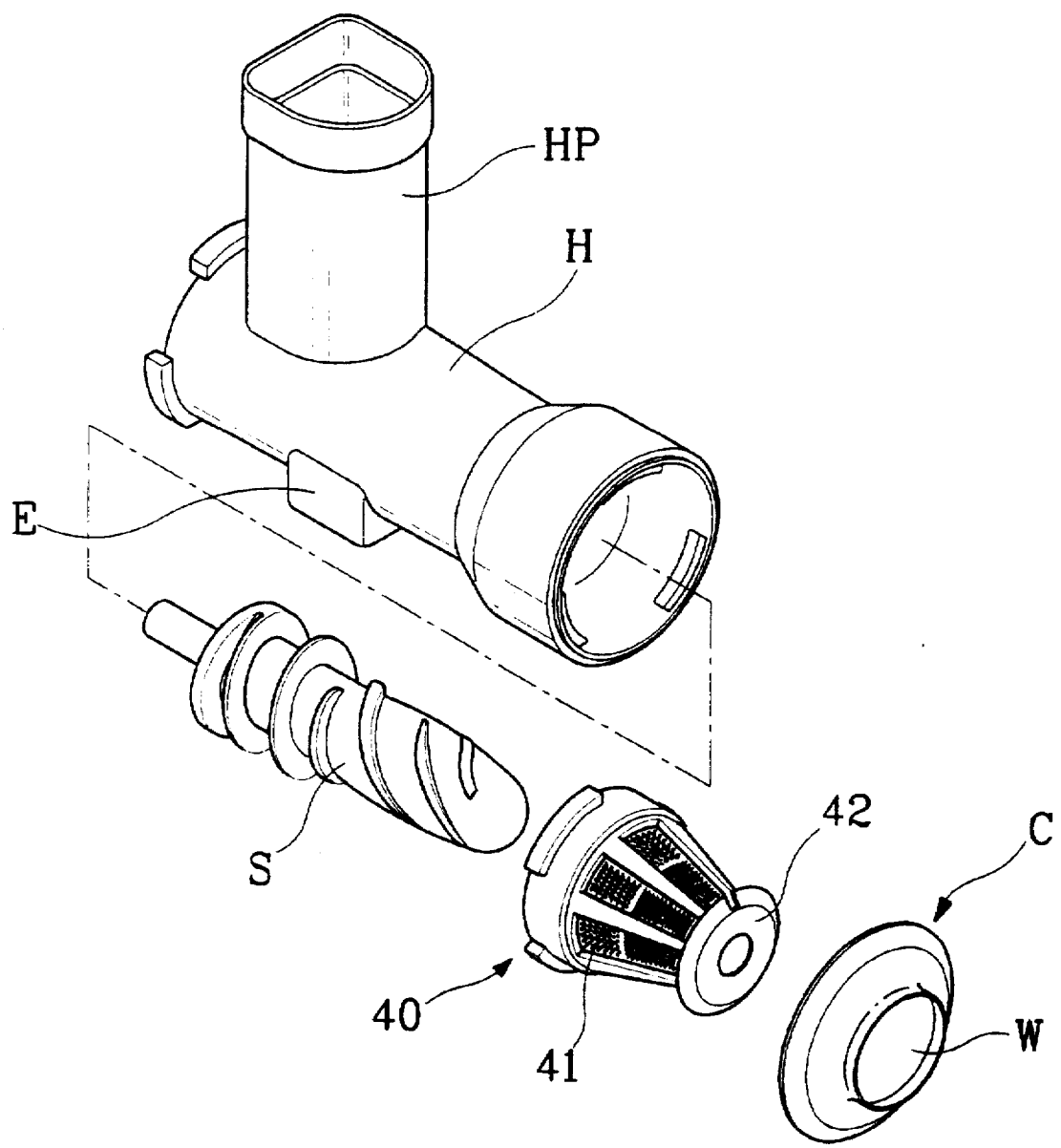

FIG. 5 illustrates a perspective disassembled view of key parts showing another embodiment of the present invention, further provided with a function for making noodle when some of components are replaced. That is, in place of the extracting net member 20, a kneading member 30 is fitted for passing flour to be kneaded therethrough, and a noodle extracting member with a round noodle section 33 or rectangular noodle section 34 to be inserted into the discharge opening W in the fastening cap C is provided, thereby allowing the juice extractor to be use for another purpose. The kneading member 30, designed to have identical outside shape with the juice extracting member 20 for fitting at the fore end of the housing H, has a passage 31 for pass of kneaded flour. And, the noodle extracting member with a round noodle section 33 or rectangular noodle section 34 to be inserted into the discharge opening W in the fastening cap C has an opening to be in communication with the passage 31 in the kneading member 30 and a plurality of small holes of either round section or rectangular section at front portion thereof to make noodle of a desired section. The unexplained reference numeral 32 denotes coupling threads. Accordingly, when the kneading member 30 and the noodle extracting member with a round noodle section 33 or rectangular noodle section 34 are fitted in place of the juice extracting member 20, and the juice extractor of the present invention is driven while kneaded flour is introduced through the hopper H, the kneaded flour passes through the screw 10 and the above components, to produce noodle of an intended section.

As has been explained, the juice extractor of the present invention can improve service by improving a crushing capability on incoming raw material and facilitating a smooth movement of the raw material, and improves juice extracting efficiency by providing two stepped diameter in the screw and the juice extracting member.

And, the detachable extracting net member and the mounting member in the juice extracting member allows efficient removal of remnants accumulated inside of the juice extractor, allowing the extractor kept clean, and the split central portion of the packing through which the remnants is to pass allows a less degradation of an elasticity of the packing even after prolonged use and improves extracting efficiency in comparison to the discharge opening in the related art without the packing.

Even when a replacement of components is required due to a degradation of elasticity or the packing, and the like, only the packing or only the mounting member with the packing fitted therein can be replaced without replacement of the entire juice extracting member, which is economical and allows best utilization of components.

Further, when the extracting net member and the mounting member are replaced with the kneading member and the noodle extracting member, the juice extractor of the present invention can be used in producing noodle, which improves use of the juice extractor.

It will be apparent to those skilled in the art that various modifications and variations can be made in the juice extractor of the present invention without departing from the spirit or scope of the invention. Thus, it is intended that the present invention cover the modifications and variations of this invention provided they come within the scope of the appended claims and their equivalents.

What is claimed is:

1. A juice extractor having a screw in a housing mounted on a shaft for being driven by a motor in a driving unit and a juice extracting member at a fore end of the screw for extracting juice from raw material introduced through a hopper, the juice extractor comprising:

the screw;

the juice extracting member; and, a secondary juice outlet, wherein, the screw having a plurality of thread end portions at each of which a thread starts, and vacant portions, both on an outer circumference thereof, a front portion having a pressing portion with a slope to reduce a diameter, and a fore end portion formed connected to the front portion and having helical threads, the juice extracting member having a cylindrical extracting net member with a juice extracting net on an outer circumference, and a plurality of longitudinal ribs on outside of the juice extracting net, for insertion of the fore end portion of the screw thereto, and a mounting member with coupling grooves in an inside diameter thereof with a number and a size to correspond to the ribs on the juice extracting member, for inserting and coupling thereto, a packing with a split portion at a thin central portion split radially for providing a passage, and a discharging portion at a front portion thereof formed as a unit with the mounting member for tight insertion into a discharge opening (W) in a fastening cap (C), and the secondary juice outlet being under a fore end of the housing for discharge of juice extracted secondarily pressed at the juice extracting member.

2. A juice extractor as claimed in claim 1, wherein, in place of the extracting net member and the mounting member, a kneading member is fitted and a noodle extracting member with a round noodle section or rectangular noodle section to be inserted into the discharge opening (W) in the fastening cap (C) is provided, for alternative use of the juice extractor.

3. A juice extractor as claimed in claim 1, wherein the split portion of the packing is bent forward for an extent.

4. A juice extractor as claimed in claim 1, wherein the packing is detachable.

5. A juice extractor as claimed in claim 3, wherein the packing is detachable.

* * * * *